United States Patent [19]
Kanda et al.

[11] Patent Number: 5,755,314
[45] Date of Patent: May 26, 1998

[54] LUBRICATING STRUCTURE FOR WET MULTI-PLATE CLUTCH

[75] Inventors: Masahiro Kanda; Naoki Uchiyama; Kouhei Ohsono; Takafumi Hattori, all of Wako, Japan

[73] Assignee: Honda Giken Kogyo Kabushiki Kaisha, Tokyo, Japan

[21] Appl. No.: 703,665

[22] Filed: Aug. 27, 1996

[30] Foreign Application Priority Data

Aug. 29, 1995 [JP] Japan ................. 7-220768

[51] Int. Cl.$^6$ ............ F16D 13/72; F16D 25/064
[52] U.S. Cl. ................. 192/70.12; 192/85 AA; 192/113.35; 192/113.36
[58] Field of Search ............... 192/70.12, 70.14, 192/85 AA, 109 A, 113.35, 113.36; 188/71.6, 264 E

[56] References Cited

U.S. PATENT DOCUMENTS

| | | |
|---|---|---|
| 3,198,295 | 8/1965 | Fangman et al. . |
| 3,231,058 | 1/1966 | Batchelor et al. . |
| 3,261,440 | 7/1966 | Graham et al. . |
| 3,351,169 | 11/1967 | McIndoe ............... 192/113.35 X |
| 4,623,055 | 11/1986 | Ohkubo ................. 192/85 AA |
| 4,995,500 | 2/1991 | Payvar ................. 192/113.36 X |
| 5,172,799 | 12/1992 | Iijima et al. . |

FOREIGN PATENT DOCUMENTS

| | | |
|---|---|---|
| 324 152 A1 | 7/1989 | European Pat. Off. . |
| 335 687 A1 | 10/1989 | European Pat. Off. . |
| 2148862 | 3/1973 | France . |
| 2 291 410 | 11/1976 | France . |
| 23 31 315 | 1/1975 | Germany . |
| 28 02 676 | 8/1979 | Germany . |
| 35 45 842 A1 | 1/1987 | Germany . |
| 1-26030 | 1/1989 | Japan ................. 192/113.35 |
| 3-103621 | 4/1991 | Japan ................. 192/113.35 |
| 4-258528 | 9/1992 | Japan . |
| 947 478 | 1/1964 | United Kingdom . |
| 2 010 422 | 6/1979 | United Kingdom . |
| 2 134 605 | 8/1984 | United Kingdom . |
| 2 149 863 | 6/1985 | United Kingdom . |
| 2 219 638 | 12/1989 | United Kingdom . |
| WO 87/05084 | 8/1987 | WIPO . |
| WO 88/07144 | 9/1988 | WIPO . |

*Primary Examiner*—Richard M. Lorence
*Attorney, Agent, or Firm*—Nikaido, Marmelstein, Murray & Oram LLP

[57] ABSTRACT

A lubricating structure for a wet multi-plate clutch is disclosed. The clutch comprises a clutch center member, a clutch guide member positioned radially outward with respect to said clutch center member, a plurality of friction plates disposed between the clutch center member and the clutch guide, the friction plates being alternately coupled to the clutch center member and the clutch guide member respectively. A clutch piston is located adjacent a first end one of the friction plates, for urging the friction plates into frictional engagement with one another, wherein a gap is formed between the piston and the end friction plate before the urging of the engagement of the friction plates. The lubricating structure comprises a first bore formed in the clutch guide member at a position near the first end one of the friction plates for discharging lubricating oil therethrough, and a second bore formed in the clutch center member for supplying lubricating oil to the clutch. The lubricating oil flows from the second bore, through the gap between the clutch piston and the first end friction plate, and through the first bore, before the clutch piston urges the friction plates into engagement, wherein the gap is closed and the flow of lubricating oil through the gap is stopped, when the clutch piston urges the friction plates into engagement.

9 Claims, 4 Drawing Sheets

LUBRICATING STRUCTURE FOR WET MULTI-PLATE CLUTCH

BACKGROUND OF THE INVENTION

1. Field of the Invention

The present invention relates to a lubricating structure for a wet multi-plate clutch comprising a plurality of laminated friction plates disposed between a clutch center member located at a radially inner side and a clutch guide member located at a radially outer side. The end friction plate located at one axial end is urged by a clutch piston to bring the friction plates into friction engagement with one another. Further, flow paths are provided for the flow of lubricating oil wherein the oil film between friction plates can be quickly cut to thereby enhance engagement responsiveness and smooth engagement.

2. Description of the Related Art

The lubricating structure for a wet multi-plate clutch is already known, for example, from Japanese Patent Application Laid-Open No. 4-258528.

Disclosed in this publication is a technique wherein a lubricating-oil supply bore is provided in the clutch center member located at the radially inner side of the friction plates of the clutch, and a lubricating-oil discharge bore is provided in the clutch guide member located at the radially outer side. Thus the friction plates which increase in temperature due to friction heat are cooled by lubricating oil supplied through the lubricating-oil supply bore and then discharged through the lubricating-oil discharge bore. The supplying of the lubricating oil to the friction plates enhances the cooling effect.

In general, in the wet multi-plate clutch, when the urging force of the clutch piston is increased to start the mutual pressure contact of the friction plates, an oil film between the friction plates is first cut and then, the friction plates are brought into a substantially engaged state. Therefore, if the cutting of the oil film is not performed quickly, not only is the responsiveness in the engagement reduced, but also the oil film is cut in a state in which the urging force of the clutch piston has been fairly increased, and the friction plates are brought into the engaged state, resulting in a problem that a transmission torque suddenly rises, and a smooth engagement cannot be achieved.

The cutting of the oil film is achieved by the fact that the lubricating oil between the friction plates is discharged mainly through a radial oil channel formed in friction faces of the friction plates. However, the flow path length of the oil channel is of a large choke shape, as compared with the cross-sectional area of the flow path and hence, the amount of the lubricating oil flowing in the oil channel is influenced by the viscosity, and especially when at a low temperature, the flow of the lubricating oil is reduced and it is difficult for the oil film to be cut. Moreover, when starting the clutch, due a larger exotherm as a result of higher frequency of service in a sliding engaged state, a large amount of the lubricating oil is supplied and for this reason, it is further difficult for the oil film to be cut. Thus the above disadvantage is liable to arise.

Particularly, in the lubricating structure described in Japanese Patent Application Laid-Open No. 4-258528, a sufficient amount of the lubricating oil is supplied to the friction plates through the large number of lubricating-oil supply bores formed in the clutch center member and hence, the problem is encountered in that the quick cutting of the oil film in the engagement is difficult.

SUMMARY OF THE INVENTION

Accordingly, it is an object of the present invention to enhance the cutting of the oil film in the engagement in a wet multi-plate clutch, while maintaining the lubricating effect for the clutch.

To achieve the above object, according to a first aspect and feature of the present invention, there is provided a lubricating structure for a wet multi-plate clutch comprising a plurality of laminated friction plates disposed between a clutch center member located at a radially inner side and a clutch guide member located at a radially outer side, wherein the end friction plate located at one axial end is urged by a clutch piston to bring the friction plates into friction engagement with one another. The clutch guide member nearer the clutch piston than the end friction plate, is formed with an oil bore for discharging lubricating oil, the lubricating oil being supplied from one axial end of the clutch center member to the vicinity of the end friction plate. Before the mutual friction engagement of the friction plates is completed, the lubricating oil which has leaked from a gap between the clutch piston and the end friction plate, is discharged through the oil bore, and after the completion of the mutual friction engagement of the friction plates, the gap is closed by the urging force of the clutch piston. Thus, the oil film between the friction plates can be quickly cut to achieve enhancement of the engagement responsiveness and a smooth engagement. Further, a sufficient amount of the lubricating oil can be supplied to between the friction plates to enhance the cooling effect.

According to a second aspect and feature of the invention, a seal member is mounted between the clutch center member and an end plate disposed at the other axial end of the friction plates.

With the above arrangement, the lubricating oil supplied to between the clutch center member and the clutch guide member is prevented from leaking from the gap between the clutch center member and the end plate and hence, the lubricating oil can be supplied without being wasted, to thereby enhance the cooling effect.

According to a third aspect and feature of the invention, the lubricating structure for the wet multi-plate clutch includes a belleville spring interposed between the clutch piston and the end friction plate.

With the above arrangement, since the belleville spring is interposed between the clutch piston and the end friction plate, the gap can be reliably produced by an non-uniform flexure before the belleville spring is fully compressed. After the belleville spring has been fully compressed, the gap is closed.

According to a fourth aspect and feature of the invention, the lubricating structure for the wet multi-plate clutch includes oil channels formed in friction faces of the friction plates for permitting the lubricating oil to flow in a radial direction.

With the above arrangement, the oil channels for permitting the lubricating oil to flow in a radial direction are formed in the friction faces of the friction plates. Therefore, even after the friction plates have been fully engaged together, the lubricating oil can continue to flow in a radial direction along the friction faces, thereby effectively cooling the friction heat generated during engagement of the wet multi-plate clutch.

The above and other objects, features and advantages of the present invention will become apparent from the following description of a preferred embodiment taken in conjunction with the accompanying drawings.

3

DETAILED DESCRIPTION OF THE PREFERRED EMBODIMENT

Figure 1:
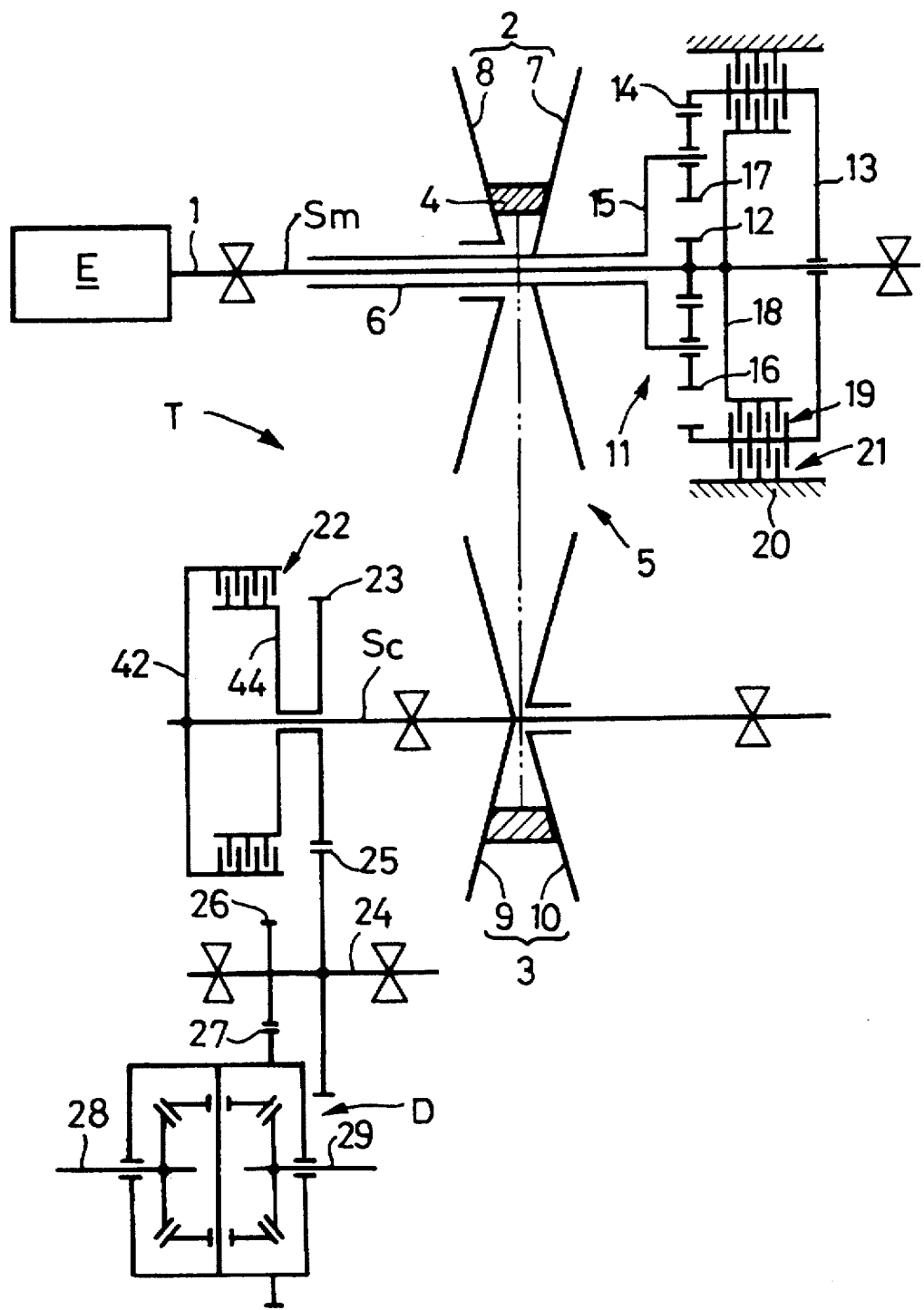
FIG. 1 is a schematic illustration of a power transmitting system in a vehicle according to an embodiment of the present invention.

Referring to FIG. 1, a transmission T is connected to an engine E disposed horizontally at a front portion of a vehicle. The transmission T includes a main shaft Sm serially connected to a crankshaft 1 of the engine for carrying a drive pulley 2, and a counter shaft Sc disposed in parallel to the main shaft Sm for carrying a driven pulley 3. An endless belt 4 including two straps (not shown) having a large number of pressing pieces mounted thereon, is wound around the drive pulley 2 and the driven pulley 3. The drive pulley 2, the driven pulley 3 and the endless belt 4 form a belt-type continuously variable transmission system 5.

The drive pulley 2 includes a stationary pulley half 7 fixed to a sleeve 6 relatively rotatably carried around an outer periphery of the main shaft Sc, and a movable pulley half 8 axially movably but relatively non-rotatably carried on the sleeve 6, for movement toward and away from the stationary pulley half 7. On the other hand, the driven pulley 3 includes a stationary pulley half 9 fixed to the counter shaft Sc and a movable pulley half 10 axially movable and relatively non-rotatably carried relative to the stationary pulley half 10.

A forward and backward movement switching mechanism 11 is provided at a right end of the main shaft Sm for transmitting the rotation of the main shaft Sm to the drive pulley 2 in the same or opposite direction. The forward and backward movement switching mechanism 11 uses a planetary gear mechanism, and includes a sun gear 12 fixedly provided on the main shaft Sm, a ring gear 14 formed around an outer periphery of a clutch outer member 13 relatively rotatably carried on the main shaft Sm, a planetary carrier 15 fixedly provided on the sleeve 6, and a plurality of inner planetary gears 16 and a plurality of outer planetary gears 17 rotatably carried on the planetary carrier 15. The inner planetary gears 16 are meshed with the sun gear 12, while the outer planetary gears 17 are meshed with the ring gear 14. The inner planetary gears 16 and the outer planetary gears 17 forming a pair, are mutually meshed.

A forward clutch 19 is disposed between the clutch outer member 13 and the clutch inner member 18 fixedly provided on the main shaft Sm and adapted to integrally couple the sun gear 12 and the ring gear 14 when the vehicle is to be driven forwards. A backward brake 21 is disposed between the clutch outer member 13 and a casing 20 and is adapted to couple the ring gear 14 to the casing 20 when the vehicle is to be driven backwards.

A starting clutch 22 which is a wet multi-plate clutch is mounted at one end of the counter shaft Sc. A final drive gear 23 is coupled to the counter shaft Sc by bringing the starting clutch 22 into an engaged state. A first reduction gear 25 and a second reduction gear 26 are fixedly provided on a reduction shaft 24 disposed parallel to the counter shaft Sc.

4

The first reduction gear 25 is meshed with the final drive gear 23, while the second reduction gear 26 is meshed with a final driven gear 27 provided around an outer periphery of a differential D. An axle 28 for a left front wheel and an axle 29 for a right front wheel, are extended leftwards and rightwards from the differential D.

Figure 2:
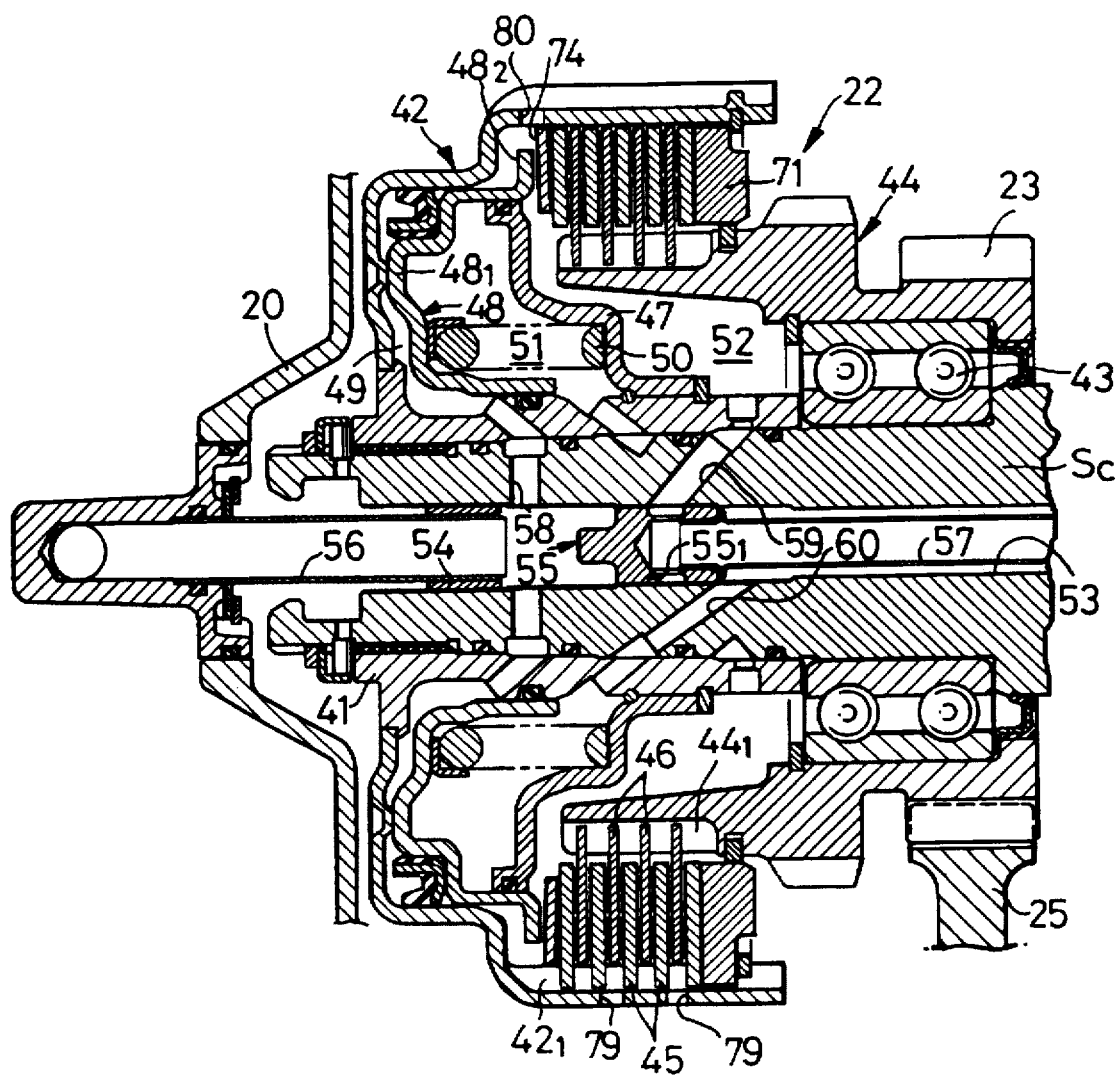
FIG. 2 is a detailed view of a starting clutch.

The structure of the starting clutch 22 will be described below with reference to FIG. 2.

The starting clutch 22 includes a clutch boss 41 spline-coupled to the outer periphery of the counter shaft Sc, a clutch guide member 42 fixedly mounted around the clutch boss 41, and a clutch center member 44 which is relatively rotatably carried around the outer periphery of the counter shaft with ball bearings 43 interposed therebetween and which is integrally provided with the final drive gear 23. Five clutch plates 45 are axially, slidably carried on spline teeth $42_1$ formed on an inner periphery of the clutch guide member 42, and four clutch disks 46 are axially slidably carried on spline teeth $44_1$ formed on an outer periphery of the clutch center member 44. The clutch plates 45 and the clutch disks 46 form friction plates according to the embodiments of the present invention and are alternately disposed so that they can be brought into close engagement with each other.

A canceller piston 47 is fixedly mounted on the outer periphery of the clutch boss 41, and a clutch piston 48 is axially, slidably carried on the clutch boss 41, the clutch guide member 42 and the canceller piston 47. A clutch oil chamber 49 is formed between the clutch guide member 42 and a body $48_1$ of the clutch piston 48 for bringing the starting clutch 22 into an engaged state, and a canceller oil chamber 51 is formed between the clutch piston 48 and the canceller piston 47 and has a return spring 50 mounted therein under compression, for returning the clutch piston 48. Further, a lubricating-oil chamber 52 is formed between the canceller piston 47 and the clutch center member 44.

Two feed pipes 56 and 57 are coaxially carried in an axial bore 53 axially extending through an interior of the counter shaft Sc with two bushes 54 and 55 interposed therebetween. A working oil fed from the left to the right as viewed in FIG. 2 through the feed pipe 56, is supplied through an oil passage 58 extending radially through the counter shaft Sc and the clutch boss 41 to the clutch oil chamber 49. A lubricating oil fed from the right to the left as viewed in FIG. 2 through the feed pipe 57, is supplied through an oil bore $55_1$ in the bush 55 and an oil passage 59 extending radially through the counter shaft Sc and the clutch boss 41 to the lubricating-oil chamber 52. The lubricating oil fed from the right to the left as viewed in FIG. 2 through an annular oil passage formed between an inner periphery of the axial bore 53 and an outer periphery of the feed pipe 57, is supplied through an oil passage 60 extending radially through the counter shaft Sc and the clutch boss 41 to the canceller oil chamber 51.

Figure 3:
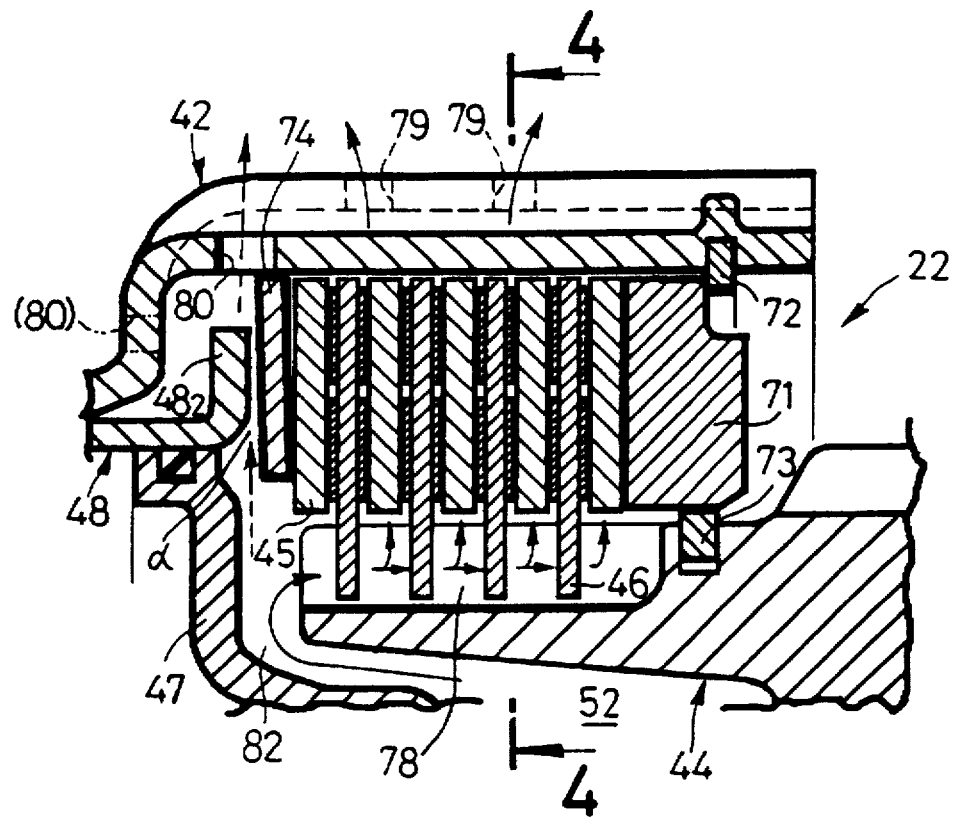
FIG. 3 is an enlarged view of a portion of the clutch shown in FIG. 2.
Figure 4:
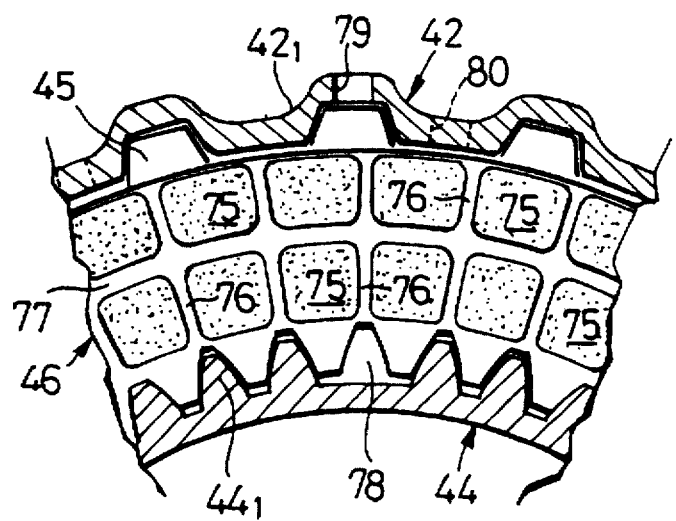
FIG. 4 is a sectional view taken along the line 4—4 in FIG. 3.

As can be seen from FIGS. 3 and 4, an end plate 71 disposed on the right of one of the five clutch plates 45 which is located at the rightmost end, is locked to the clutch guide member 42 by a clip 72 and sealed from the clutch center member 44 by a seal member 73. A belleville spring 74 is disposed to the left of one of the five clutch plates 45 which is located at the leftmost end (and which will be referred to as end clutch plate 45 hereinafter), and an urging portion $48_2$ of the clutch piston 48 is opposed to the left side of the belleville spring 74. Thus, when the clutch piston 48 is moved to the right, the clutch plates 45 and the clutch disks 46 are urged toward the end plate 71. At this time, not only the urging force of the clutch piston 48 can be equally transmitted to the end clutch plate 45, but also the shock generated upon abutment of the clutch piston 48 against the end clutch plate 45 can be moderated.

As can be seen from FIG. 4, facing members 75 having a high friction coefficient are affixed to opposite sides of the clutch disks 46, and a plurality of radial oil channels 76 and a single peripheral oil channel 77 are formed between the facing members 75. Thus, even if the clutch disks 46 and the clutch plates 45 are brought into close contact with each other, the lubricating oil can flow outwards from the radially inner side through the radial oil channels 76 due to centrifugal force and at this time, the flow of the lubricating oil can be enhanced by the circumferential oil channel 77.

Three of the spline teeth $44_1$ formed on the clutch center member 44 to carry the clutch disks 46, which are spaced at distances of 120°, are eliminated, and oil passages 78 are formed in such portions. The lubricating oil chamber 52 leads to the oil passages 78 through an oil passage 82 formed around the clutch center member 44. Thus, the lubricating oil within the lubricating oil chamber 52, can flow axially through the oil passages 78 to reach abutment faces of the clutch plates 45 and the clutch disks 46, as indicated by solid line arrows in FIG. 3.

Two first oil bores 79 as oil bore means are formed in a valley (a larger-diameter portion) of every other (or every second) spline tooth $42_1$ of the clutch guide member 42, and a single second oil bore 80 as oil bore means is formed in a crest (a smaller-diameter portion) of every other spline tooth $42_1$. The first oil bores 79 are located radially outside of the laminated clutch plates 45 and clutch disks 46, and the second oil bore 80 is located radially outside of the abutment between the belleville spring 74 and the clutch piston 48.

The operation of the embodiment of the present invention having the above-described construction will be described below.

The driving force from the engine E is transmitted from the crankshaft 1 to the main shaft Sm, but when both the forward clutch 19 and the backward clutch 21 of the forward-backward movement switching mechanism 19 are in a non-engaged state, the rotation of the main shaft Sm is not transmitted to the drive pulley 2. When the forward clutch 19 is brought into an engaged state from the above state, the sun gear 12 provided on the main shaft Sm and the clutch outer member 13 having the ring gear 14 are integrally coupled to each other. This limits the rotation of both the planetary gears 16 and 17 and hence, the rotation of the main shaft Sm is transmitted from the sun gear 12 through both the planetary gears 16 and 17 directly to the planetary carrier 15, thereby rotating the drive pulley 2 coupled to the planetary carrier through the sleeve 6 at the same speed and in the same direction as the main shaft Sm.

When the drive pulley 2 is rotated in the above manner, the driven pulley 3 is driven through the endless belt 4 to rotate the counter shaft Sc which carries the driven pulley 3. When a pressure oil is supplied from the feed pipe 56 through the oil passage 58, to the clutch oil chamber 49 in order to bring the starting clutch 22 into its engaged state from the above state, the clutch piston 48 is moved to the right, thereby causing the urging portion $48_2$ to bring the clutch plates 45 and the clutch disks 46 into close contact with each other. As a result, the rotation of the counter shaft Sc is transmitted via the clutch guide member 42, the clutch plates 45 and the clutch disks 46 to the clutch center member 44. Then, the rotation of the final driven gear 23 provided on the clutch center member 44, is transmitted through the first reduction gear 25, the second reduction gear 26, the final driven gear 27 and the differential D to the axles 28 and 29 for the left and right front wheels.

On the other hand, when the backward brake 21 of the forward/backward movement switching mechanism 11 is brought into an engaged state, the clutch outer member 13 is integrally coupled to the casing 20. As a result, the sun gear 12 integral with the main shaft Sm rotates the planetary carrier 15 in the opposite direction from the rotational direction of the main shaft Sm through both the planetary gears 16 and 17 and thus, the drive pulley 2 coupled to the planetary carrier 15 through the sleeve 6, is driven in the opposite direction from the direction during the above-described forward movement. Therefore, in this state, when the starting clutch 22 is brought into its engaged state, the vehicle is driven to travel backwards or rearward.

When the vehicle travels forwards or backwards in the above manner, if the movable pulley half 8 of the drive pulley 2 is moved by a hydraulic pressure to increase or decrease the groove width, and the movable pulley half 10 of the driven pulley 3 is moved to decrease or increase, the effective radii of both the pulleys 2 and 3 are varied and hence, the reduction ratio between the driven pulley 2 and the driven pulley 3 can be continuously controlled through the endless belt 4.

The lubricating oil for lubricating the clutch plates 45 and the clutch disks 46 of the starting clutch 22, is supplied from the feed pipe 57 via the oil bore 59 to the lubricating-oil chamber 52. A portion of the lubricating oil flows around the left end of the clutch center member 44, between the clutch plates 45 and the clutch disks 46, as indicated by the solid line arrows in FIG. 3, then flows radially outwards therefrom due to centrifugal force, and is discharged through the oil bores 79 in the clutch guide member 42. When the starting clutch 22 is in its non-engaged state, a slight gap α (see FIG. 3) is formed between the urging portion $48_2$ of the clutch piston 48 and the belleville spring 74 and hence, a portion of the lubricating oil within the lubricating-oil chamber 52, is passed through the gap α and discharged through the oil bores 80 in the clutch guide member 42 by the centrifugal force, as indicated by dashed line arrows in FIG. 3.

Figure 5:
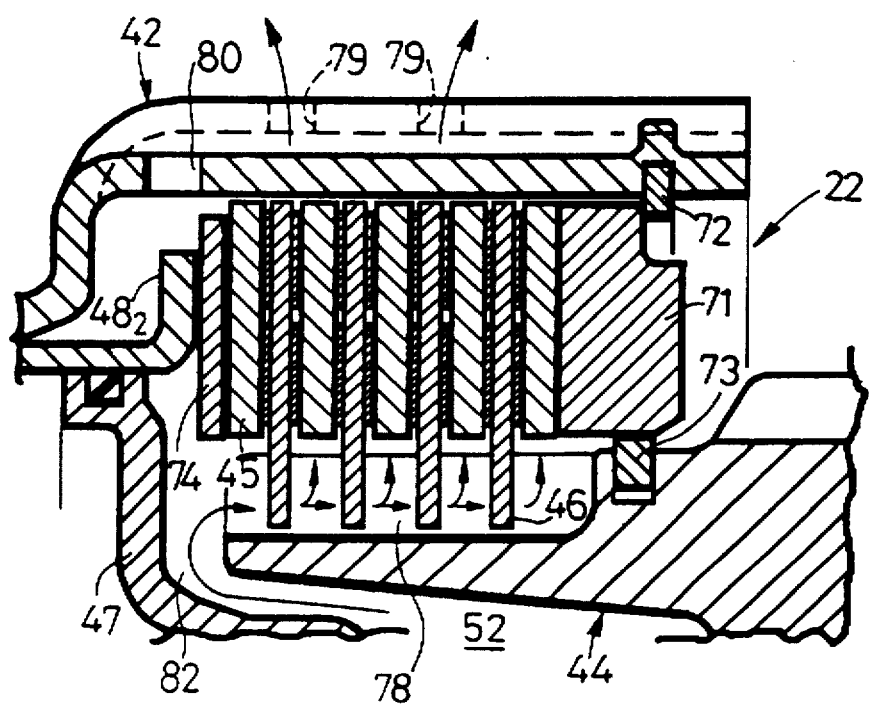
FIG. 5 is a cross-sectional view of a portion of the clutch for explaining the operation.

Even if the clutch piston 48 is moved to the right to start the compression of the belleville spring 74 by the urging portion $48_2$, the gap a is not immediately closed because of the non-uniform flexure of the belleville spring 74 and a slight inclination of the clutch piston 48, and the lubricating oil still continues to flow through a path as shown by the dashed line arrows. When the belleville spring 74 has been fully compressed to complete the engagement of the starting clutch 22, as shown in FIG. 5, the gap α is eliminated and the flow of the lubricating oil is blocked. Thus, the entire amount of the lubricating oil flows between the clutch plates 45 and the clutch disks 46 and is discharged through the oil bores 79, as shown by the solid line arrows.

When the clutch plates 45 and the clutch disks 46 are brought into close contact with each other upon the engagement of the starting clutch 22, it is required for purpose of enhancing the responsiveness in the engagement and achieving a smooth engagement that an oil film intervening between both the plates 45 and 46 is cut quickly. Therefore, according to the embodiment of the present invention, a portion of the lubricating oil can be discharged to the outside of the clutch guide member 42 through the gap α left between the clutch piston 48 and the belleville spring 74 during the cutting of the oil film during the engagement. Thus, the amount of the lubricating oil supplied between the plates 45 and 46 can be reduced to achieve the quick cutting of the oil film and to achieve an enhancement in engagement responsiveness and a smooth engagement. Especially, since the lubricating oil is supplied around the left end of the clutch center member 44 to near the left end clutch plate 45 (namely, near the gap α formed between the clutch piston 48 and the belleville spring 74, the cutting of the oil film can be further achieved quickly). By supplying the lubricating oil around the left end of the clutch center member 44 through the oil passage 82, the need to define a lubricating-oil supply bore in the clutch center member is eliminated, leading to a reduced number of working steps.

When the oil film is cut to start the substantial engagement, the belleville spring 74 is fully compressed to close the gap a and hence, the entire amount of lubricating oil flows between the clutch plates 45 and the clutch disks 46 and is discharged through the oil bores 79. During this time, the leakage of the lubricating oil is prevented by the seal member 73 mounted between the clutch center member 44 and the end plate 71 and hence, the lubricating oil can be effectively supplied to the clutch plates 45 and the clutch disks 46. As a result, the clutch plates 45 and the clutch disks 46, which are in engagement with each other and thus generate friction heat, can be effectively cooled by a sufficient amount of the lubricating oil flowing through the oil channels 76 and 77 in the clutch disks 46.

By a simple structure in which the second oil bores 80 are only provided in the clutch guide member 42, such advantages are achieved that an amount of lubricating oil sufficient to cool the friction heat generated during engagement of the starting clutch 22, can be supplied between the clutch plates 45 and the clutch disks 46, and at the stage of cutting of the oil film in the course of engagement, a portion of the lubricating oil can be discharged without passing between the clutch plates 45 and the clutch disks 46, thus achieving the quick cutting of the oil film.

The positions of the second oil bores 80 are not limited to those in the embodiment shown in FIG. 3. Although the belleville spring 74 is interposed between the clutch piston 48 and the end clutch plate 45 in the embodiment shown, the belleville spring 74 can be disposed at a location adjacent the end plate 71, or the belleville spring 74 itself can be eliminated, or another member other than the belleville spring 74 can be used. When the belleville spring 74 is eliminated, a tip end of the urging portion 48₂ of the clutch piston 48 is in direct contact with the end clutch plate 45. However, when the starting clutch 22 is brought into its engaged state, the clutch piston 48 is advanced while being slightly tilted and hence, before the engage pressure is sufficiently increased, the gap α can be formed between the urging portion 48₂ and the end clutch plate 45. In place of the oil channels 76 and 77 being formed only in the clutch disks 46, oil channels 76 and 77 may be formed in both the clutch disks 46 and the clutch plates 45 or only in the clutch plates 45. The present invention is applicable to a wet multi-plate clutch for any use in addition to the starting clutch which is disclosed.

The present invention may be embodied in other specific forms without departing from the spirit or essential characteristics thereof. The presently disclosed embodiment is therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. A lubricating structure for a wet multi-plate type rotatable clutch comprising a clutch center member, a clutch guide member positioned radially outward with respect to said clutch center member, a plurality of friction plates disposed between said clutch center member and said clutch guide member, said friction plates being alternately coupled to said clutch center member and said clutch guide member respectively, and clutch piston means located adjacent a first end one of said friction plates, for urging said friction plates into frictional engagement with one another, wherein a gap is formed between said clutch piston means and said end friction plate before the urging of the engagement of the friction plates; and wherein said clutch center member has a radially outer surface for carrying thereon a part of said friction plates, a radially inner surface and a free axial end portion located near said first end one of the friction plates; said lubricating structure comprising:

(a) oil bore means formed in said clutch guide member at a position near said first end one of said friction plates for discharging lubricating oil therethrough;

(b) oil passage means formed around said free axial end portion of said clutch center member for providing one and only one communication between said radially inner and outer surfaces of said clutch center member and supplying lubricating oil to said radially outer surface;

(c) wherein lubricating oil flows from said oil passage means, through said gap between said clutch piston means and said first end friction plate, and through said oil bore means, before said clutch piston means urges said friction plates into engagement and wherein said gap is closed and the flow of lubricating oil through said gap is stopped while lubricating oil is guided through said oil passage means from said radially inner surface to said radially outer surface while flowing around said free axial end portion, when said clutch piston means urges said friction plates into engagement.

2. A lubricating structure set forth in claim 1, wherein said clutch includes an end plate disposed adjacent a second end one of said friction plates, said second end one of said friction plates being located at the end of said friction plates opposite to said first end one of said friction plates, and wherein said lubricating structure includes a seal means positioned between said second end friction plate and said clutch center member.

3. A lubricating structure as set forth in claim 1, further including resilient means positioned between said clutch piston means and said first end friction plate.

4. A lubricating structure as set forth in claim 3, wherein said resilient means is a belleville spring.

5. A lubricating structure as set forth in claim 1, wherein said friction plates include lubricating oil channels formed on friction faces thereof.

6. A lubricating structure as set forth in claim 5, wherein said lubricating oil channels are formed in a radial direction.

7. A lubricating structure as set forth in claim 6, wherein said lubricating oil channels include at least one channel in a circumferential direction.

8. A lubricating structure as set forth in claim 5, wherein said friction plates include friction facing members on the friction faces thereof and wherein said lubricating oil channels are formed between said friction facing members.

9. A lubricating structure as set forth in claim 1, wherein said clutch center member has teeth provided on said radially outer surface for carrying said part of said friction plates, a part of said teeth having been eliminated to provide axially extending branches of said oil passage means.

* * * * *